United States Patent [19]

Kuwano

[11] 4,369,947
[45] Jan. 25, 1983

[54] WIRE HARNESS FIXING ASSEMBLY

[75] Inventor: Fumiyoshi Kuwano, Yokohama, Japan

[73] Assignee: Nissan Motor Co., Ltd., Yokohama, Japan

[21] Appl. No.: 204,805

[22] Filed: Nov. 7, 1980

[30] Foreign Application Priority Data

Nov. 8, 1979 [JP] Japan .......................... 54-154193[U]

[51] Int. Cl.³ ............................................... F16L 3/08
[52] U.S. Cl. .................................... 248/74 A; 24/350; 174/164
[58] Field of Search .................. 248/49, 74 A, 74 PB, 248/73, 221.4, 500, 507; 174/40 CC, 164, 156; 24/263 R, 350

[56] References Cited

U.S. PATENT DOCUMENTS

| 2,489,477 | 11/1949 | Brecher | 248/507 X |
| 2,730,781 | 1/1956 | Alunas | 24/350 X |
| 2,819,858 | 1/1958 | Mittendorf | 248/500 X |
| 3,169,439 | 2/1965 | Rapata | 248/74 PB |

OTHER PUBLICATIONS

Prior Art, As Identified by Applicant, (FIG. 1), Application Serial Number 204,805, Filing Date 12/08/80.

*Primary Examiner*—William H. Schultz
*Assistant Examiner*—Ramón O. Ramírez
*Attorney, Agent, or Firm*—Lowe, King, Price & Becker

[57] ABSTRACT

First and second post members are protrusively provided on a support wall to form therebetween a space for receiving therein a wire harness. A retaining member has an elongated strip portion and a pin portion projecting from the strip portion. The retaining member pin portion is inserted into a bore formed in the first post member and is retained therewithin by means of a tubular clip member. The retaining member strip portion is rotatable about the pin portion to assume a first operative position where it longitudinally extends between the first and second post members to obstruct the path for access to the space and a second operative position where it opens the path for access to the space. There is provided means for releasably locking the strip portion in the first operative position thereof.

14 Claims, 3 Drawing Figures

U.S. Patent     Jan. 25, 1983     4,369,947
FIG.1
(PRIOR ART)
FIG.2
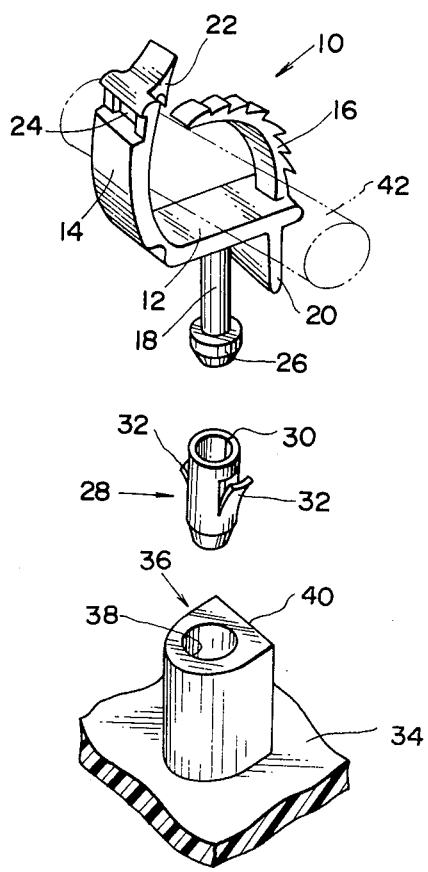
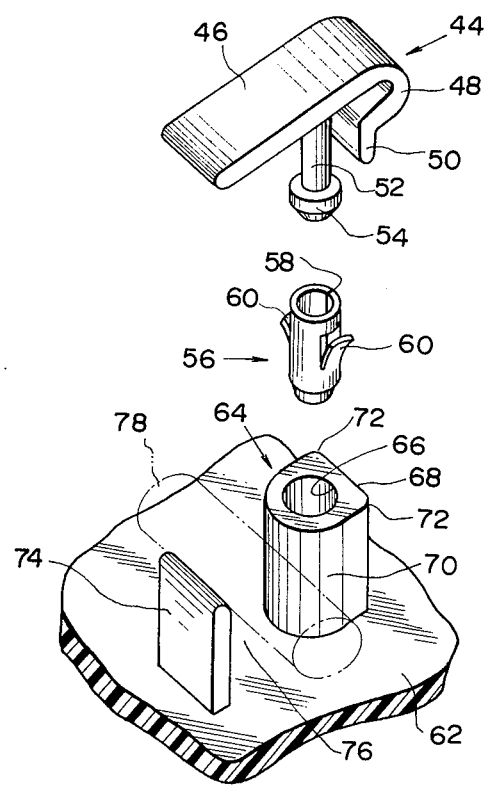
FIG.3
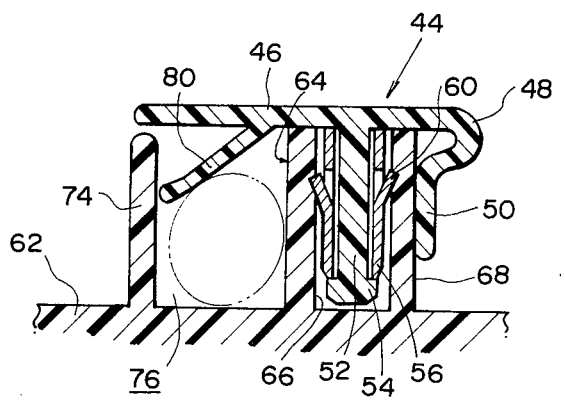

WIRE HARNESS FIXING ASSEMBLY

BACKGROUND OF THE INVENTION

1. Field of the Invention

The present invention relates to an assembly for fixing an elongated object such as a wire harness to a support.

2. Description of the Prior Art

In FIG. 1, there is shown, in an exploded manner, a prior art fixing assembly for a wire harness.

Referring to FIG. 1, a wire harness clamp 10 is a one-piece molded object of plastic material and in the form of having a base 12, a pair of gripping arms 14 and 16, a pin 18 and a lug 20. The arm 14 has at the free end thereof a hook 22 and an opening 24, and the other arm 16 has a series of teeth formed on the outer surface thereof. The pin 18 has at the free end thereof a ridge 26. A tubular clip 28 is made of metal and its tubular wall is axially cut at 30 throughout the length thereof so that the clip 28 is resiliently expansible in diameter upon attachment to the pin 18. The tubular clip 28 is provided with a plurality of locking tonques 32 struck out from the tubular wall thereof. A support 34, which is a constituent part of a device or a structure and formed of plastic material, is provided with a boss 36 protruding therefrom. The boss 36 has an inner bore 38 and a flat side face 40.

In use, the tubular clip 28 is attached to the pin 18. This is attained by passing the ridge 26 through the clip 28. The pin 18 and the clip 28 brought together are then inserted into the inner bore 38 of the boss 36, and at the same time the lug 20 is brought into engagement with the side face 40 of the boss 36. The clamp 10 is thus prevented from rotational movement about the pin 18 relative to the support 34 by the interengagement of the lug 20 and the side face 40 of the boss 40, while the pin 18 and the clip 28 are retained in position within the bore 38 by the locking engagement of the tongues 32 with the wall of the bore. A wire harness 42 is placed on the base 12, and the gripping arms 14 and 16 are placed around the harness. By passing the end portion of the arm 16 through the opening 24 of the arm 14 and engaging the hook 22 with a suitable one of the teeth on the arm 16, the harness 42 is tightly gripped or embraced by the clamp 10 and fixed to the support 34. The harness 42 may be detached, if necessary, by pulling the distal end of the arm 14 in a certain direction to disengage the hook 22 from the working tooth of the arm 16 and allow the free ends of the arms 14 and 16 to part from each other.

The prior art wire harness fixing assembly of the above described type is disadvantageous in that it requires a relatively large space above the support. More specifically, the assembly requires a relatively large extent of space in the direction perpendicular to the surface of the support in facing relationship to the harness, since the assembly is constructed and arranged so as to support the harness at a certain distance from the surface of the support. When supported at a certain distance from the support, the wire harness has an increased possibility to interfere with the adjacent objects. Still furthermore, the assembly is expensive in manufacturing cost due to the complicated shape of the wire harness clamp. Yet furthermore, the efficiency in the wire harness attachment and detachment jobs by the assembly is limited since, for example, it is difficult to do the attachment job by one hand.

SUMMARY OF THE INVENTION

A device for fixing an elongated object to a support according to the present invention, comprises first and second post members protrusively provided to the support. The first and second post members are adapted to form therebetween a space for receiving therein the elongated object. A retaining member is provided which includes an elongated strip portion longitudinally extending between the first and second post members to retain the elongated object within the space. The retaining member further includes a pin portion which projects from the strip portion and is inserted into a bore formed in the first post member. Clip means is also provided for retaining the pin portion within the bore.

It is an object of the present invention to provide an improved device or assembly for fixing an elongated object to a support, which does not require a large space above the support.

It is another object of the present invention to provide an improved device or assembly of the above mentioned character, which enables the elongated object to be fixed at a position in close proximity to the support.

It is a further object of the present invention to provide an improved device or assembly of the above mentioned character, which is made of simply shaped constituent parts and therefore economical in manufacturing cost.

It is a still further object of the present invention to provide an improved device or assembly of the above-mentioned character, which enables the elongated object attachment and detachment jobs to be done with an increased efficiency.

BRIEF DESCRIPTION OF THE DRAWINGS

The features and advantages of the fixing assembly according to the present invention will become more clearly appreciated from the following description taken in conjunction with the accompanying drawings, in which:

FIG. 1 is an exploded view of a prior art wire harness fixing assembly which the present invention is concerned with;

FIG. 2 is an exploded view of an assembly for fixing an elongated object to a support according to the present invention; and FIG. 3 is a sectional view showing a modification of the assembly according to the present invention.

DESCRIPTION OF THE PREFERRED EMBODIMENTS

In FIG. 2, there is shown in an exploded manner a fixing assembly or device according to the present invention. The fixing assembly comprises a retaining member 44 which is a one-piece molded object of plastic material. The retaining member 44 is in the form of having an elongated flat strip portion 46, a springing or resilient bent portion 48 extendedly provided to one end of the strip portion 46, a lug portion 50 downwardly depending from one end of the bent portion 48, and a pin portion 52 downwardly depending from the strip portion 46 in the same direction as the lug portion 50 and having a ridge 54 formed at the free end thereof. A tubular clip member 56 is made of sheet metal and its tubular wall is axially cut at 58 throughout the length thereof so that the clip member 54 is resiliently expansible in diameter to allow the passage of the ridge 54 upon attachment to the retainer member pin portion 52. The clip member 56 is provided with a plurality of locking tongue portions 60 struck out from the tubular wall thereof. As shown, the tongue portons 60 respectively extend upwardly and outwardly toward the distal ends thereof. A support 62 is a wall portion of a constituent part of a device or a structure and formed of plastic material. A first post member 64 is protrusively provided on the support wall 62 and has an inner bore 66 extending axially thereof. The first post member 64 is circumferentially shaped to have a substantially flat wall portion 68, a cylindrical wall portion 70 and a pair of rounded corner wall portions 72 extendedly provided between the flat wall portion 68 and the cylindrical wall portion 70. On the support wall 62 there is also protrusively provided a second post member 74 which is arranged substantially parallel to the first post member flat wall portion 68 and on the opposite side to same with respect to the bore 66. The first and second post members 64 and 74 are in spaced facing relation ship to form therebetween a space 76 for receiving therein an elongated object such as a wire harness 78. The spacing between the first and second post members 64 and 74 is determined suitably in dependence on the thickness of a wire harness to be placed therebetween.

In use, a wire harness 78 is placed between the first and second post members 64 and 74. The tubular clip member 56 is attached to the retaining member pin portion 52. This is attained by passing the pin portion ridge 54 through the clip member 56. The clip member 56 is adapted to have a loose-fitting relation to the pin portion, so that the pin portion is rotatable within the clip member. This clip member attaching process or job may be made beforehand, since the clip member, once attached, is positively retained on the pin portion 52 by the ridge 54. The retaining member pin portion 52 and the clip member 56 joined together are then inserted into the first post member bore 66, and at the same time the retaining member lug portion 50 is brought into engagement with the first post member flat wall portion 68. The retaining member 44 is prevented from rotating about the pin portion 52 relative to the first post member 64 by the interengagement of the retaining member lug portion 50 and the first post member flat wall portion 68, while the pin portion 50 and the clip member 56 are retained in position within the bore 66 since the distal ends of the clip member tongue portions 60 locking engage or bite into the bore 66 wall. When the retaining member 44 is mounted on the first post member 64 in the above manner, the elongated strip portion 46 is put into a first operative position where it longitudinally extends between the first and second post members 64 and 74 retaining the wire harness 78 within the space 76. That is, the strip portion 46 in the first operative position obstructs the path for access to the space 76.

The retaining member strip portion 46, however, can be moved from the first operative position into a second operative position where it opens the path for access to the space 76. This is attained by rotating the retaining member 44 about in any direction about the pin portion 52 with a rotative force larger than a predetermined value. That is, when the retaining member 44 is subjected to a rotative force more than a predetermined value in any direction, the bent portion 48 resiliently flexes allowing the lug portion 50 to move over corresponding one of the corner wall portions 72. The strip portion 46 in the second operative position longitudinally extends across the direction in which the strip portion in the first operative position longitudinally extends between the first and second post members 64 and 74. In other words, the strip portion 46 in the second operative position longitudinally extends substantially parallel to the wire harness placed or to be placed in the space 76.

By putting the retaining member strip portion 46 in the second operative position, the wire harness attaching and detaching jobs can be performed. Thereafter, the strip portion is put into the first operative position to retain the wire harness within the space 76.

In FIG. 3, there is shown a modified embodiment of a fixing assembly according to the present invention. The assembly of FIG. 3 is substantially the same as that of FIG. 2 except for a retaining tongue 80 for yielding pushing the wire harness 78 against the support wall 62. As shown, the tongue 80 is protrusively provided to the underside of the retaining member strip portion 46 and extends slantwise into the space 76. This tongue 78 enables the assembly to firmly grip the wire harness allowing the variations in thickness of the wire harness.

Obviously, many variations and modifications of the present invention are possible in light of the above teachings. It is, therefore, to be understood that within the scope of the appended claims the invention may be practiced otherwise than as specifically described.

What is claimed is:

1. A device for retaining an elongated object against a substantially flat support or workpiece, comprising:
   a first post member projecting upwardly from said support or workpiece and having an axially extending inner bore;
   a second post member projecting from said support or workpiece and spaced apart from said first post member to define a space therebetween for receiving therein the elongated object;
   a retaining member separate from the first and second post members and having an elongated strip portion being longitudinally positionable to extend between said first and second post members above the space to retain the elongated object within said space immediately adjacent the support, said retaining member further including a pin portion projecting from said strip portion and being insertable into said bore; and
   clip means for retaining said pin portion within said bore;
   said first post member including an outer shape having a substantially flat wall portion with a pair of rounded edges, and a cylindrical wall portion;
   said retaining member further including a resilient bent portion extendedly provided at one end of said strip portion and a lug portion extending from one end of said bent portion in substantially the same direction as said pin portion, said lug portion being engageable with the flat wall portion to prevent the strip portion from rotating about the pin portion to maintain the strip portion in a first operative position extending longitudinally between said first and second post members to retain the object in said space, said resilient bent portion being flexible to allow said lug portion to move around one of the rounded edges, enabling said strip portion to move into a second operative position whereby said elongated object can be removed or positioned within said space.

2. A device as claimed in claim 1, wherein said pin portion has a ridge at a free end thereof, said clip means having a tubular clip member mounted on said pin portion and retained thereon by the ridge, said tubular clip member having a tubular wall being axially cut throughout the length thereof for attachment to said pin portion in a loose-fitting relationship therewith to enable the pin portion to be rotatable within the clip member, said tubular clip member further having a plurality of locking tongue portions projecting outwardly from said tubular wall, said locking tongue portions lockingly engaging the wall of said bore to retain said pin portion within said bore.

3. A device as claimed in claim 1, wherein said retaining member further includes a tongue provided on said strip portion at an acute angle to the strip to extend into said space, said tongue being operative to yieldingly urge the elongated object against said support.

4. A device as claimed in claim 1, 2, or 3, wherein said retaining member is a one-piece molded object of plastic material.

5. A device as claimed in claim 1, wherein said first and second post members are formed of plastic material and integral with said support.

6. A device as claimed in claim 1, wherein said second post member is in the form of a flat plate being substantially parallel to said flat wall portion of the first post member, said second post member being located adjacent the cylindrical wall portion to define the space therewith.

7. An assembly for fixing a wire harness to a support structure, comprising:
- a support wall constituting part of said support structure;
- a first post member fixedly attached and protrusively provided on said support wall and having an inner bore extending axially thereof;
- a second post member fixedly attached and protrusively provided on said support wall, said first and second post members being in spaced and facing relationship to form with said support wall a space for receiving therein the wire harness;
- a retaining member having an elongated flat strip portion longitudinally extending between said first and second post members to retain the wire harness within said space, said retaining member further having a pin portion projecting from said strip portion and inserted into said bore, means permitting said strip portion to be selectively movable into and out of a position above the space; and
- clip means for retaining said pin portion within said bore.

8. An assembly as claimed in claim 7, wherein said first post member is circumferentially shaped to have a substantially flat wall portion, a cylindrical wall portion and a pair of rounded corner wall portions, said retaining member further including a resilient bent portion extendedly provided to one longitudinal end of said strip portion and a lug portion extending from one end of said bent portion in substantially the same direction as said pin portion, said lug portion engaging said first post member flat wall portion to prevent said strip portion from rotating about said pin portion and thereby maintain the strip portion at a first operative position extending longitudinally between said first and second post members to obstruct the access path to said space, said resilient bent portion being resiliently flexible to allow said lug portion to move over any of said corner wall portions whereby said strip portion is movable into a second operative position to open the path for access to said space.

9. An assembly as claimed in claim 7, wherein said retaining member pin portion has a ridge at a free end thereof, and said clip means includes a tubular clip member mounted on said pin portion and retained thereon by said pin portion ridge, said tubular clip member having a tubular wall which is axially cut throughout the length thereof for attachment to said pin portion so that the pin portion is rotatable within the clip member, said tubular clip member further having a plurality of locking tongue portions projecting out from said tubular wall, said locking tongue portions lockingly engaging the wall of said bore and thereby retaining said pin portion within said bore.

10. An assembly as claimed in claim 7, in which said retaining member further includes a tongue provided on said strip portion so as to extend slantwise into said space, said tongue being operative to yieldingly push the wire harness against said support wall.

11. An assembly as claimed in claim 7, 8, 9 or 10, wherein said retaining member is a one-piece molded object of plastic material.

12. An assembly as claimed in claim 7, wherein said first and second post members are formed of plastic material and integral with said support wall.

13. An assembly as claimed in claim 8, wherein said second post member is in the form of a flat plate being substantially parallel to said first member flat wall portion, said second post member being located on the opposite side to said first post member flat wall portion with respect to said bore.

14. A device for retaining an elongated object against a substantially flat support surface, comprising:
 (a) first and second post members projecting upwardly from the support surface to define therewith a space for receiving the object on the support surface; and
 (b) means for retaining the object within the space, said retaining means including a first portion engagable with the first post member and a second portion carrying resiliently yieldable locking means for maintaining said second portion in a first operative position extending above the space between the first and second post in a manner preventing the object from being lifted out of the space, said locking means enabling the second portion to rotate about the first portion into a second operative position allowing removal of the object in a direction away from the surface.

* * * * *